US012405545B2

(12) United States Patent
Saeki et al.

(10) Patent No.: US 12,405,545 B2
(45) Date of Patent: Sep. 2, 2025

(54) TONER AND METHOD FOR PRODUCING TONER

(71) Applicant: CANON KABUSHIKI KAISHA, Tokyo (JP)

(72) Inventors: Tatsuya Saeki, Shizuoka (JP); Taiji Katsura, Shizuoka (JP); Masamichi Sato, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 604 days.

(21) Appl. No.: 17/814,143

(22) Filed: Jul. 21, 2022

(65) Prior Publication Data

US 2023/0047560 A1 Feb. 16, 2023

(30) Foreign Application Priority Data

Jul. 28, 2021 (JP) ................................ 2021-123742

(51) Int. Cl.

*G03G 9/097* (2006.01)
*G03G 9/08* (2006.01)
*G03G 9/087* (2006.01)

(52) U.S. Cl.

CPC ....... *G03G 9/09716* (2013.01); *G03G 9/0804* (2013.01); *G03G 9/08755* (2013.01)

(58) Field of Classification Search

CPC ............. G03G 9/09716; G03G 9/0804; G03G 9/08755; G03G 9/08; G03G 9/087; G03G 9/0819; G03G 9/08711; G03G 9/0823

See application file for complete search history.

(56) References Cited

U.S. PATENT DOCUMENTS

| | | | |
|---|---|---|---|
| 7,537,877 | B2 | 5/2009 | Yoshiba |
| 7,544,455 | B2 | 6/2009 | Yoshiba |
| 7,700,254 | B2 | 4/2010 | Moribe |
| 7,740,998 | B2 | 6/2010 | Yamazaki |
| 7,796,926 | B2 | 9/2010 | Matsuda |
| 7,855,042 | B2 | 12/2010 | Kobori |
| 7,858,282 | B2 | 12/2010 | Ayaki |
| 8,057,977 | B2 | 11/2011 | Moribe |
| 8,372,573 | B2 | 2/2013 | Ayaki et al. |
| 8,383,313 | B2 | 2/2013 | Ayaki |
| 8,551,680 | B2 | 10/2013 | Ayaki |
| 9,097,998 | B2 | 8/2015 | Yamazaki |
| 9,128,400 | B2 | 9/2015 | Takahashi |
| 9,201,323 | B2 | 12/2015 | Nishikawa |
| 9,250,548 | B2 | 2/2016 | Nomura |
| 9,261,804 | B2 | 2/2016 | Yamazaki |
| 9,341,970 | B2 | 5/2016 | Yoshiba |
| 9,423,708 | B2 | 8/2016 | Tominaga |
| 9,606,462 | B2 | 3/2017 | Nomura |
| 9,632,441 | B2 | 4/2017 | Abe |
| 9,720,340 | B2 | 8/2017 | Tominaga |
| 9,733,583 | B2 | 8/2017 | Kuroki |
| 9,733,584 | B2 | 8/2017 | Masumoto |
| 9,785,077 | B2 | 10/2017 | Abe |
| 9,829,818 | B2 | 11/2017 | Yoshiba |
| 9,829,820 | B2 | 11/2017 | Masumoto |
| 9,897,932 | B2 | 2/2018 | Hotta |
| 9,921,501 | B2 | 3/2018 | Mochizuki |
| 9,971,263 | B2 | 5/2018 | Fukudome |
| 10,101,683 | B2 | 10/2018 | Nishikawa |
| 10,114,303 | B2 | 10/2018 | Katsura |
| 10,241,430 | B2 | 3/2019 | Kimura |
| 10,289,016 | B2 | 5/2019 | Fukudome |
| 10,295,921 | B2 | 5/2019 | Ohmori |
| 10,303,074 | B2 | 5/2019 | Yamawaki |
| 10,429,757 | B2 | 10/2019 | Yoshida |
| 10,503,090 | B2 | 12/2019 | Tominaga |
| 10,545,422 | B2 | 1/2020 | Yamawaki |
| 10,578,990 | B2 | 3/2020 | Tsuda |
| 10,635,011 | B2 | 4/2020 | Umeda |
| 10,678,155 | B2 | 6/2020 | Terui |
| 10,732,529 | B2 | 8/2020 | Yoshiba |
| 10,747,133 | B2 | 8/2020 | Yagi |
| 10,747,134 | B2 | 8/2020 | Watanabe |

(Continued)

FOREIGN PATENT DOCUMENTS

| | | | |
|---|---|---|---|
| EP | 3 674 806 | A1 | 7/2020 |
| JP | 8-248670 | A | 9/1996 |
| JP | 2001-228650 | A | 8/2001 |
| JP | 2004-287185 | A | 10/2004 |
| JP | 2007-25525 | A | 2/2007 |
| JP | 2007-241310 | A | 9/2007 |
| JP | 2008-158176 | A | 7/2008 |
| JP | 2009-186512 | A | 8/2009 |
| JP | 2009-300848 | A | 12/2009 |

(Continued)

OTHER PUBLICATIONS

U.S. Appl. No. 17/655,414, Hidekazu Fumita, filed Mar. 18, 2022.

(Continued)

*Primary Examiner* — Peter L Vajda
*Assistant Examiner* — Grant Steven Seiler
(74) *Attorney, Agent, or Firm* — VENABLE LLP

(57) ABSTRACT

A toner comprising: a toner particle comprising a binder resin; and an external additive on a surface of the toner particle, wherein the binder resin comprises a resin having an ester bond, a peak corresponding to boric acid is detected in ATR-IR analysis of the toner particle in an ATR method using germanium as an ATR crystal, and when a dispersed solution obtained by dispersing the toner in an aqueous solution containing a surfactant is subjected to a detachment treatment A including shaking for 300 seconds using a shaker, and when an external additive detached from the toner by the detachment treatment A is denoted as external additive A, a charge amount of the external additive A using a standard carrier (F81) is −0.5 μC/g or less.

6 Claims, 1 Drawing Sheet

(56) References Cited

U.S. PATENT DOCUMENTS

| | | | |
|---|---|---|---|
| 10,768,540 B2 | 9/2020 | Watanabe | |
| 10,782,623 B2 | 9/2020 | Yoshiba | |
| 10,809,639 B2 | 10/2020 | Yamawaki | |
| 10,845,721 B2 | 11/2020 | Tanaka | |
| 10,942,463 B2 | 3/2021 | Yoshiba | |
| 10,942,465 B2 | 3/2021 | Kototani | |
| 10,942,466 B2 | 3/2021 | Tominaga | |
| 10,969,704 B2 | 4/2021 | Kagawa | |
| 10,976,679 B2 | 4/2021 | Tanaka | |
| 11,003,104 B2 | 5/2021 | Katsura | |
| 11,003,105 B2 | 5/2021 | Sato | |
| 11,099,493 B2 | 8/2021 | Komiya | |
| 11,112,709 B2 | 9/2021 | Saeki | |
| 11,112,713 B2 | 9/2021 | Akiyama | |
| 11,169,460 B2 | 11/2021 | Kototani | |
| 11,181,844 B2 | 11/2021 | Nagaoka | |
| 11,249,408 B2 | 2/2022 | Tsuda | |
| 11,262,666 B2 | 3/2022 | Yoshiba | |
| 2005/0255399 A1 | 11/2005 | Ichikawa | |
| 2008/0227003 A1* | 9/2008 | Honda et al. | G03G 13/14 |
| 2009/0196658 A1 | 8/2009 | Sugiura | |
| 2012/0052430 A1 | 3/2012 | Yamasaki | |
| 2013/0171551 A1 | 7/2013 | Sun | |
| 2013/0252167 A1 | 9/2013 | Moribe | |
| 2014/0004460 A1 | 1/2014 | Yoshiba | |
| 2014/0295341 A1 | 10/2014 | Fomitchev | |
| 2015/0220013 A1 | 8/2015 | Nishikawa | |
| 2015/0248072 A1 | 9/2015 | Katsuta | |
| 2016/0161874 A1 | 6/2016 | Yamazaki | |
| 2017/0010547 A1* | 1/2017 | Bejat et al. | G03G 9/08 |
| 2019/0243272 A1* | 8/2019 | Sakurada et al. | G03G 9/097 |
| 2020/0064751 A1 | 2/2020 | Murayama | |
| 2020/0073266 A1 | 3/2020 | Ohtsu | |
| 2020/0285169 A1 | 9/2020 | Kubo | |
| 2021/0223731 A1 | 7/2021 | Suzuki | |
| 2021/0255557 A1 | 8/2021 | Kuzmenka | |
| 2021/0373450 A1 | 12/2021 | Kawaguchi | |
| 2021/0397110 A1 | 12/2021 | Katsura | |
| 2022/0121132 A1 | 4/2022 | Yoshida | |
| 2022/0121133 A1 | 4/2022 | Yamawaki | |
| 2022/0128916 A1 | 4/2022 | Yoshida | |
| 2022/0171302 A1 | 6/2022 | Sato | |
| 2022/0291601 A1 | 9/2022 | Katsura | |
| 2023/0004099 A1 | 1/2023 | Seino | |
| 2023/0051836 A1 | 2/2023 | Tominaga | |
| 2023/0065610 A1 | 3/2023 | Yoshiba | |

FOREIGN PATENT DOCUMENTS

| | | | |
|---|---|---|---|
| JP | 2011-59261 | A | 3/2011 |
| JP | 2012-47914 | A | 3/2012 |
| JP | 2013-20113 | A | 1/2013 |
| JP | 2015-506494 | A | 3/2015 |
| JP | 6059251 | B2 | 1/2017 |
| JP | 2019-159001 | A | 9/2019 |
| JP | 2020-34901 | A | 3/2020 |
| JP | 2020-106816 | A | 7/2020 |
| WO | 2013/063291 | A1 | 5/2013 |

OTHER PUBLICATIONS

U.S. Appl. No. 17/814,089, Masatake Tanaka, filed Jul. 21, 2022.
U.S. Appl. No. 17/814,094, Shohei Tsuda, filed Jul. 21, 2022.
U.S. Appl. No. 17/935,721, Takashi Kenmoku, filed Sep. 27, 2022.
U.S. Appl. No. 17/936,104, Tatsuya Saeki, filed Sep. 28, 2022.
U.S. Appl. No. 17/936,943, Kozue Uratani, filed Sep. 30, 2022.

* cited by examiner

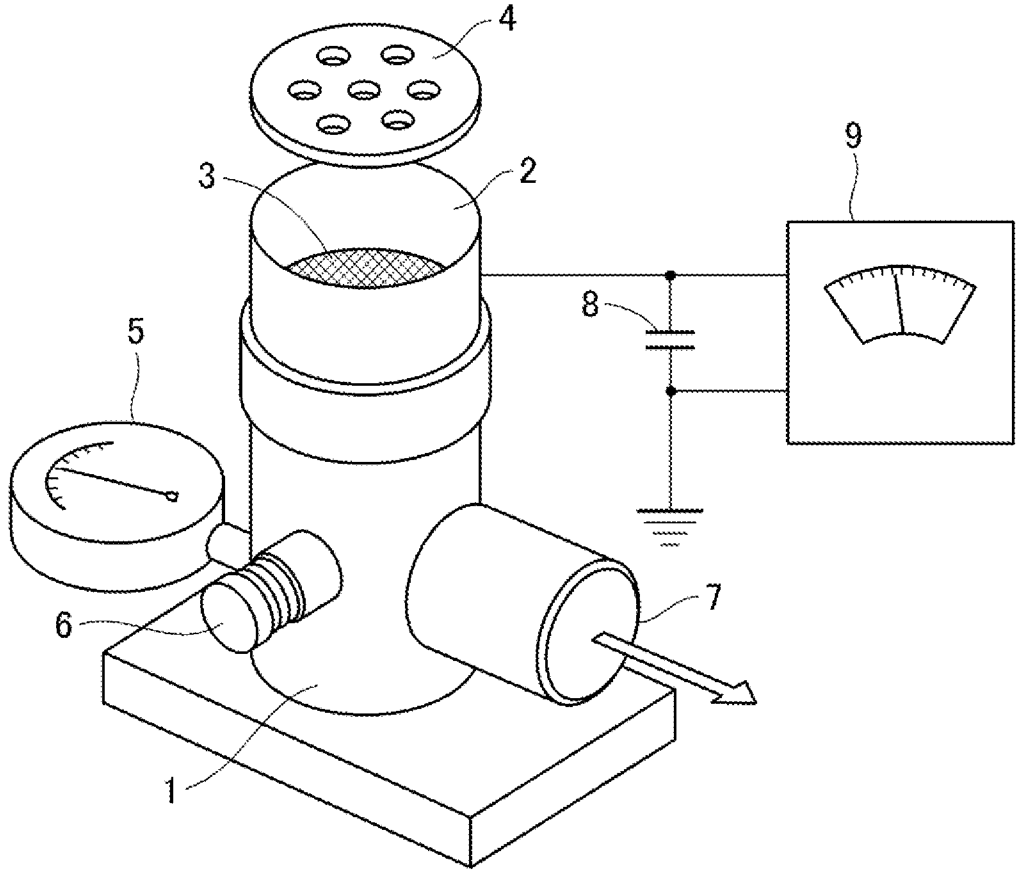
4
9
3
2
8
5
6
7
1

TONER AND METHOD FOR PRODUCING TONER

BACKGROUND OF THE INVENTION

Field of the Invention

The present disclosure relates to: a toner that is able to be used in electrophotography methods, electrostatic recording methods, toner jet recording methods, and the like (hereinafter referred to simply as a "toner" in some cases); and a method for producing the toner.

Description of the Related Art

In recent years, demands have increased for significantly higher processing speeds and longer service lives for electrophotographic image forming apparatuses. We recognize that technological developments, such as stabilizing the charging performance of a toner during long term use, are needed in order to maintain quality in electrophotographic images.

It is essential to rapidly charge a toner in order to increase the speed of a printer, and one means for achieving this is to fix an external additive having negative properties. For example, Japanese Patent Application Publication No. 2008-158176 discloses treating an external additive by using a combination of a fluorine-containing silane coupling agent and a hydrophobizing agent other than a fluorine-containing silane coupling agent. In addition, Japanese Patent Application Publication No. H08-248670 discloses titania, which has been surface treated with a hydrophobizing agent and a fluorine-based silane coupling agent, as an external additive.

However, if an external additive becomes buried as a result of long term use in a printer having a longer service life, embedded portions may become locally charged up following long term use. In addition, if an external additive migrates as a result of long term use, toner charging distribution may become broader.

That is, as processing speeds significantly increase and service lives are extended, it is essential to stabilize the state of an external additive at a toner particle surface even if stress on the toner increases.

SUMMARY OF THE INVENTION

Our investigations have confirmed that by using an external additive that has been subjected to a strongly negative treatment, as disclosed in Japanese Patent Application Publication Nos. 2008-158176 and H08-248670, a toner having excellent charge rising performance can be obtained. However, it was recognized that there is still room for improvement in terms of significantly increasing processing speeds and extending service lives. More specifically, it was understood that if a strongly negative external additive becomes detached in the latter half of long term use, toner charging distribution becomes broader and image streaks occur.

One method for suppressing detachment of an external additive in the latter half of long term use is to apply a strong force so as to embed the external additive in a toner particle, as disclosed in Japanese Patent Application Publication No. 2020-106816. However, it was understood that embedded portions become locally charged up following long term use, and that the charged toner causes black spots on white background parts of an image.

The present disclosure provides a toner that can overcome a trade-off between suppressing image streaks and suppressing black spots even after long term use in an image forming apparatus having a longer service life.

The present disclosure relates to a toner comprising:

a toner particle comprising a binder resin; and an external additive on a surface of the toner particle, wherein the binder resin comprises a resin having an ester bond, a peak corresponding to boric acid is detected in ATR-IR analysis of the toner particle in an ATR method using germanium as an ATR crystal, and when a dispersed solution obtained by dispersing the toner in an aqueous solution containing a surfactant is subjected to a detachment treatment A including shaking for 300 seconds using a shaker, and when an external additive detached from the toner by the detachment treatment A is denoted as external additive A, a charge amount of the external additive A using a standard carrier (F81) is −0.5 μC/g or less.

The present disclosure relates to a method for producing the above toner, the method comprising:

(1) a dispersion step for preparing a dispersed solution of binder resin fine particles containing the binder resin;

(2) an aggregation step for aggregating binder resin fine particles contained in the dispersed solution of binder resin fine particles so as to form aggregates; and (3) a fusion step for heating and fusing the aggregates, the method further comprising:

adding a boric acid source to the dispersed solution in at least one of the step (2) and the step (3).

The present disclosure can provide a toner that can overcome a trade-off between suppressing image streaks and suppressing black spots even after long term use in an image forming apparatus having a longer service life.

Further features of the present invention will become apparent from the following description of exemplary embodiments with reference to the attached drawings.

BRIEF DESCRIPTION OF THE DRAWINGS

The FIGURE is a schematic view of an apparatus for measuring charge quantity.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

The present disclosure relates to a toner comprising:

a toner particle comprising a binder resin; and an external additive on a surface of the toner particle, wherein the binder resin comprises a resin having an ester bond, a peak corresponding to boric acid is detected in ATR-IR analysis of the toner particle in an ATR method using germanium as an ATR crystal, and when a dispersed solution obtained by dispersing the toner in an aqueous solution containing a surfactant is subjected to a detachment treatment A including shaking for 300 seconds using a shaker, and when an external additive detached from the toner by the detachment treatment A is denoted as external additive A, a charge amount of the external additive A using a standard carrier (F81) is −0.5 μC/g or less.

The inventors of the present invention found that by incorporating boric acid in a toner particle and using a specific external additive mentioned above, it is possible to overcome a trade-off between suppressing image streaks and suppressing black spots even after long term use. The inventors of the present invention think that this is because embedding of the negatively treated external additive is suppressed by hardness close to the toner particle surface while the negatively treated external additive remains fixed by an electrical effect as a result of uneven distribution of electrons in a B—O bond in boric acid.

The inventors of the present invention have surmised that the reason why the toners set forth in Japanese Patent Application Publication Nos. 2008-158176 and H08-248670 cannot sufficiently suppress image streaks after long term use when the processing speed is significantly increased and the service life is extended is as follows. Because these toners contain an external additive having negative properties, it is considered that initial charge rising is improved and the start-up speed of a printer and initial image density can be improved. However, in a printer in which the processing speed is significantly increased and the service life is extended, separation charging from the toner occurs when the external additive having negative properties migrates, and toner charging distribution becomes broader following long term use. This is thought to be because the manner in which an electrostatic latent image bearing member is coated by the toner becomes non-uniform, and parts, over which the toner cannot spread to form an image, remain as streaks.

However, the inventors of the present invention have surmised that the reason why the toner set forth in Japanese Patent Application Publication No. 2020-106816 cannot sufficiently suppress black spots after long term use when the processing speed is significantly increased and the service life is extended is as follows. In this toner, because an external additive having negative properties is strongly bonded to the toner, it is considered that migration of the external additive following long term use is suppressed and image streaks are suppressed. However, in a printer in which the processing speed is significantly increased and the service life is extended, embedding of the external additive having negative properties in the toner becomes faster following long term use, and toner charging up occurs. It is thought that a number of charged up toner particles accumulate on white background parts and form black spots.

Therefore, in a printer in which the processing speed is significantly increased and the service life is extended, it was difficult in the past to achieve a balance between suppressing image streaks and suppressing black spots following long term use because charging occurs earlier as a result of the external additive having negative properties.

We carried out investigations into methods by which a fixed state can be maintained even if an external additive is not embedded at a toner particle surface. In general, forces that fix an external additive to a toner particle surface are electrostatic forces of attachment. In order to fix an external additive having negative properties without embedding, attention was focused on electrostatic forces of attachment, which occur between a toner particle surface and an external additive, and it was thought that it is important for these to occur within an appropriate range. In view of the considerations above, we carried out further investigations and found that the toner according to the present disclosure can meet the above-mentioned requirements well.

The toner of the present disclosure contains a toner particle, which contains a binder resin, and an external additive. When a dispersed solution obtained by dispersing the toner in an aqueous solution containing a surfactant is subjected to a detachment treatment A comprising shaking for 300 seconds using a shaker, an external additive detached from the toner by the detachment treatment A is denoted as external additive A. In addition, the toner is characterized in that the charge amount of the external additive A using a standard carrier (F81) is −0.5 μC/g or less. The charge amount of the external additive A using a standard carrier (F81) is preferably from −30.0 μC/g to −1.0 μC/g, and more preferably from −25.0 μC/g to −5.0 μC/g. If the charge amount of the external additive A using a standard carrier (F81) falls within the range mentioned above, charge rising of the toner becomes faster and initial image density can be improved.

Furthermore, the toner having the external additive A contains a resin having an ester bond as a binder resin, and IR analysis of the toner particle using an ATR method (crystal: Ge) is controlled so that boric acid is detected. It was understood that this configuration can achieve a balance between suppressing image streaks and suppressing black spots following long term use. It is surmised that the reason why it is possible to achieve a balance between suppressing image streaks and suppressing black spots following long term use if boric acid is detected is as follows.

In the ATR method, if an absorption spectrum is measured within the wavelength range 4000 $cm_{-1}$ to 650 $cm_{-1}$ at an incidence angle of 45° using germanium (Ge) in an ATR crystal, the presence of an absorption peak at 1380 $cm_{-1}$ means that boric acid is present at a depth of approximately 0.3 μm. That is, if a peak corresponding to boric acid is detected from a toner particle in ATR-IR analysis using germanium, this means that boric acid is present close to the toner particle surface.

If boric acid is present close to the toner particle surface, it is thought that electrostatic forces of attachment, which occur as a result of uneven distribution of electrons in a B—O bond in boric acid and the negative properties of the external additive A, create a suitable fixed state. Therefore, it is thought that it is possible to suppress image streaks and black spots and to form a high quality electrophotographic image stably after long term use even if the processing speed is significantly increased and the service life is extended.

The binder resin contains a resin that contains an ester bond. Due to the presence of the resin containing an ester bond, embedding of the external additive is suppressed because the vicinity of the toner particle surface has an appropriate hardness as a result of interactions with the boric acid.

The binder resin having an ester bond is not particularly limited, but from the perspective of attaining a suitable hardness near the surface, the binder resin is preferably selected from the group consisting of styrene acrylic resins, polyester resins, and mixed resins and composite resins of these. Examples of composite resins include hybrid resins having a styrene acrylic resin segment and a polyester resin segment.

A polyester resin is more preferred from the perspective of controlling the fixing ratio of the external additive.

The external additive A in the toner is preferably surface treated with a fluorine-containing silane coupling agent. By surface treating with a fluorine-containing silane coupling agent, the charge amount of the external additive A using a standard carrier (F81) can be readily adjusted within a suitable range. In addition, the charge amount of the external additive A can also be controlled using a modified silicone oil or the like.

In addition, the content of the external additive A in the toner is preferably 0.10 parts by mass or more, more preferably 0.20 parts by mass or more, and further preferably 0.50 parts by mass or more, relative to 100 parts by mass of the toner particle. If the external additive A is contained at an amount within the range mentioned above, charge rising of the toner becomes faster and initial image density can be improved.

In addition, the upper limit is not particularly limited, but is preferably 10.00 parts by mass or less, more preferably 5.00 parts by mass or less, and further preferably 2.50 parts by mass or less, relative to 100 parts by mass of the toner particle. If the upper limit falls within the range mentioned above, it is possible to suppress contamination of key parts within a cartridge. The content of the external additive A is preferably from 0.10 parts by mass to 10.00 parts by mass relative to 100 parts by mass of the toner particle.

The external additive should be one that satisfies the charge quantity mentioned above when detached to form the external additive A, but is preferably inorganic fine particles having a size of approximately 10 to 300 nm. The number average particle diameter of the external additive or the external additive A is more preferably 20 to 100 nm, and further preferably 30 to 50 nm. Examples thereof include silica fine particles, alumina fine particles, titanium oxide fine particles and strontium titanate fine particles. Of these, the external additive preferably contains strontium titanate fine particles. By containing strontium titanate fine particles, electrostatic forces of attachment to the toner increase and it is therefore possible to better suppress contamination of members.

When a dispersed solution obtained by dispersing the toner in an aqueous solution containing a surfactant is subjected to a detachment treatment B comprising shaking for 30 seconds using a shaker, an external additive detached from the toner by the detachment treatment B is denoted as external additive B. Here, the amount of the external additive B relative to the amount of the external additive A is preferably 20 mass % or more, more preferably 30 mass % or more, and further preferably 40 mass % or more. Within the range mentioned above, it is possible to reduce the amount of readily embeddable external additive, and it is therefore possible to better suppress black spots following long term use.

In addition, the amount of the external additive B relative to the amount of the external additive A is preferably 80 mass % or less, more preferably 70 mass % or less, and further preferably 60 mass % or less. Within the range mentioned above, it is possible to reduce the amount of external additive that can readily migrate, and it is therefore possible to better suppress image streaks following long term use. The amount of the external additive B relative to the amount of the external additive A is preferably from 20 mass % to 80 mass %.

The amount of the external additive B relative to the amount of the external additive A can be controlled by altering the particle size, hardness or amount of the external additive or the duration or strength of external addition.

In addition, the content of the external additive B in the toner is preferably 0.05 parts by mass or more, more preferably 0.10 parts by mass or more, and further preferably 0.40 parts by mass or more, relative to 100 parts by mass of the toner particle. Within this range, it is possible to better suppress image streaks following long term use. In addition, the content of the external additive B in the toner is preferably 5.00 parts by mass or less, more preferably 2.00 parts by mass or less, and further preferably 1.50 parts by mass or less, relative to 100 parts by mass of the toner particle. Within this range, contamination of members in a cartridge can be ameliorated and fogging caused by long term use can be better suppressed.

In addition, the content of the external additive in the toner is preferably from 0.10 parts by mass to 10.00 parts by mass, more preferably from 0.20 parts by mass to 5.00 parts by mass, and further preferably from 0.50 parts by mass to 2.50 parts by mass, relative to 100 parts by mass of the toner particle.

Among the external additive in the toner, the content of the external additive A, which is detached from the toner by detachment treatment A, is preferably from 50 mass % to 100 mass %, more preferably from 80 mass % to 100 mass %, further preferably from 90 mass % to 100 mass %, and further preferably from 95 mass % to 100 mass %.

The means for incorporating the boric acid in the toner particle is not particularly limited. For example, the boric acid can be internally added to the toner particle or can be incorporated in the toner particle by being used as a flocculant in an aggregation method. By adding the boric acid as a flocculant, it is easier to introduce the boric acid near the toner particle surface. At a stage where the boric acid is used as a raw material, the boric acid may be used in a form such as an organic boric acid, a boric acid salt or a boric acid ester. In a case where the toner particle is produced in an aqueous medium, the boric acid is preferably added as a boric acid salt from the perspectives of reactivity and production stability, with specific examples thereof including sodium tetraborate and ammonium borate, and it is particularly preferable to use borax.

Because borax is sodium tetraborate ($Na_2B_4O_7$) decahydrate and is converted into boric acid in acidic aqueous solutions, it is preferable to use borax in a case where the boric acid is used in an acidic environment in an aqueous medium.

In addition, in fluorescence X-Ray measurements of the toner particle, the intensity of boron derived from the boric acid is preferably from 0.10 kcps to 0.60 kcps, and more preferably from 0.10 kcps to 0.30 kcps. By controlling the intensity within this range, it becomes easier to achieve a balance between improving toner charging performance and preventing separation charging when the external additive becomes detached.

A means for controlling the intensity of boron within the range mentioned above is to, for example, regulate the added quantity of a boric acid source when the toner particle is produced, and it is preferable to regulate the content of the boric acid in the toner particle to from 0.1 mass % to 10.0 mass %. The content of the boric acid in the toner particle is preferably from 0.4 mass % to 5.0 mass %, and more preferably from 0.8 mass % to 2.0 mass %.

Methods for producing components that constitute the toner and a method for producing the toner will now be explained in greater detail.

Binder Resin

The toner particle contains a binder resin. The content of the binder resin is preferably 50 mass % or more of the entire amount of resin components in the toner particle.

The binder resin should contain a resin having an ester bond, and is not particularly limited, and well-known resins can be used. A styrene acrylic resin or a polyester resin is preferred. A polyester resin is more preferred.

The polyester resin can be obtained by using a well-known method, such as a transesterification method or a polycondensation method, by selecting and combining appropriate materials from among polycarboxylic acids, polyols, hydroxycarboxylic acids, and the like. The polyester resin preferably contains a condensation polymer of a dicarboxylic acid and a diol.

A polycarboxylic acid is a compound having two or more carboxyl groups per molecule. Of these, a dicarboxylic acid is a compound having two carboxyl groups per molecule, and is preferably used.

Examples thereof include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

In addition, examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having two or more hydroxyl groups per molecule. Of these, a diol is a compound having two hydroxyl groups per molecule, and is preferably used.

Specific examples include ethylene glycol, diethylene glycol, triethylene glycol, 1,2-propane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred. A compound represented by formula (A) below can be given as an example of an alkylene oxide adduct of bisphenol A.

(A)

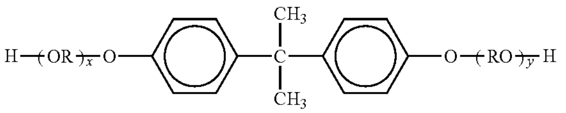

(In formula (A), R moieties are each independently an ethylene group or a propylene group, x and y are each an integer of 0 or more, and the average value of x+y is from 0 to 10.)

The alkylene oxide adduct of bisphenol A is preferably a propylene oxide adduct and/or ethylene oxide adduct of bisphenol A. A propylene oxide adduct is more preferred. In addition, the average value of x+y is preferably from 1 to 5.

Examples of trihydric or higher alcohols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher alcohols in isolation or a combination of two or more types thereof.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methyl styrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene;

(meth)acrylic monomers such as methyl (meth)acrylate, ethyl (meth)acrylate, n-propyl (meth)acrylate, iso-propyl (meth)acrylate, n-butyl (meth)acrylate, iso-butyl (meth) acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth) acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth) acrylate, (meth)acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbontrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sulfur compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added quantity of polymerization initiator varies according to the target degree of polymerization, but is generally a quantity of from 0.5 parts by mass to 20.0 parts by mass relative to 100.0 parts by mass of polymerizable monomer.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes, and natural waxes and derivatives thereof, such as carnauba wax and candelilla wax, and derivatives include oxides, block copolymers with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a polyolefin, a hydrocarbon wax produced using the Fischer Tropsch process or a petroleum-based wax is preferred from the perspectives of developing performance and transferability being improved. Moreover, antioxidants may be added to these waxes as long as the advantageous effect of the toner is not impaired. In addition, from the perspectives of phase separation from the binder resin and crystallization temperature, preferred examples include higher fatty acid esters such as behenyl behenate and dibehenyl sebacate.

In addition, the content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent that exhibits thermal properties such as those mentioned above, a releasing effect is efficiently achieved and a broader fixing range is ensured.

Plasticizer

The toner particle may contain a crystalline plasticizer in order to improve sharp melt properties. The plasticizer is not particularly limited, and well-known plasticizers used in toners, such as those listed below, can be used.

Specific examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Colorant

The toner particle may contain a colorant. A well-known pigment or dye can be used as the colorant. From the perspective of excellent weathering resistance, a pigment is preferred as the colorant.

Examples of cyan colorants include copper phthalocyanine compounds and derivatives thereof, anthraquinone compounds and basic dye lake compounds. Specific examples thereof include the following. C.I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples thereof include the following. C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Examples of yellow colorants include condensed azo compounds, isoindolinone compounds, anthraquinone compounds, azo metal complexes, methine compounds and allylamide compounds.

Specific examples thereof include the following. C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of black colorants include carbon black and materials colored black using the yellow colorants, magenta colorants and cyan colorants mentioned above. It is possible to use one of these colorants in isolation, or a combination thereof, and these can be used in the form of solid solutions. The content of the colorant is preferably from 1.0 parts by mass to 20.0 parts by mass relative to 100.0 parts by mass of the binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35° C. to 90° C., a peak molecular weight (Mp) of from 10,000 to 30,000, and a weight average molecular weight (Mw) of from 25,000 to 50,000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof. The added quantity of the charge control agent or charge control resin is preferably from 0.01 parts by mass to 20.0 parts by mass, and more preferably from 0.5 parts by mass to 10.0 parts by mass, relative to 100.0 parts by mass of the binder resin.

Toner Production Method

The method for producing the toner is not particularly limited, and a well-known method such as a pulverization method, a dissolution suspension method, an emulsion aggregation method or a dispersion polymerization method can be used. In any of these toner particle production methods, it is preferable to obtain a toner particle by adding a boric acid source when the raw materials are mixed. Here, the toner is preferably produced using the method described below. That is, the toner is preferably produced using an emulsion aggregation method.

The toner production method preferably includes steps (1) to (3) below (1) a dispersion step for preparing a dispersed solution of binder resin fine particles that contain the binder resin, (2) an aggregation step for aggregating binder resin fine particles contained in the dispersed solution of binder resin fine particles so as to form aggregates, and (3) a fusion step for heating and fusing the aggregates, and the method comprising:

adding a boric acid source to the dispersed solution in at least one of the step (2) and the step (3).

A case where the toner is produced using an emulsion aggregation method is preferred from the perspectives of ease in controlling the shape of the toner and the boric acid tending to be homogeneously dispersed near the toner particle surface. Details of the emulsion aggregation method will now be described.

Emulsion Aggregation Method

An emulsion aggregation method is a method in which toner particles are produced by first preparing aqueous dispersed solutions of fine particles which comprise the constituent materials of the toner particles and which are substantially smaller than the desired particle diameter, and then aggregating these fine particles in an aqueous medium until the particle diameter of the toner particles is reached, and then carrying out heating or the like so as to fuse the resin.

That is, in an emulsion aggregation method, a toner is produced by carrying out a dispersion step for producing dispersed solutions comprising fine particles of constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a sphere-forming step for carrying out further heating or the like so as to melt the resin and control the toner surface form; a cooling step thereafter; a metal removal step for filtering the obtained toner and removing excess polyvalent metal ions; a filtering/washing step for filtering the obtained toner and washing with ion exchanged water or the like; and a step for removing water from the washed toner and drying.

Step of Preparing Resin Fine Particle-Dispersed Solution (Dispersion Step)

The resin fine particle-dispersed solution can be prepared by known methods, but is not limited to these methods. Examples of known methods include, for example, an emulsion polymerization method, a self-emulsifying method, a phase inversion emulsification method in which a resin is emulsified by adding an aqueous medium to a resin solution obtained by dissolution in an organic solvent, or a forced emulsification method in which an organic solvent is not used and a resin is forcibly emulsified by high-temperature treatment in an aqueous medium.

Specifically, a binder resin is dissolved in an organic solvent capable of dissolving the resin, and a surfactant or a basic compound is added. At that time, where the binder resin is a crystalline resin having a melting point, the resin may be melted by heating above the melting point. Subsequently, the aqueous medium is slowly added while stirring with a homogenizer or the like to precipitate the resin fine particles. Then, the solvent is removed by heating or reducing the pressure to prepare an aqueous dispersion liquid of resin fine particles. As the organic solvent used to dissolve the resin, any organic solvent that can dissolve the resin can be used, but from the viewpoint of suppressing the generation of coarse powder, it is preferable to use an organic solvent that forms a uniform phase with water such as toluene.

The surfactant to be used at the time of emulsification is not particularly limited, and examples thereof include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like. The surfactants may be used alone or in combination of two or more.

Examples of the basic compound to be used in the dispersion step include an inorganic base such as sodium hydroxide, potassium hydroxide, and the like; and an organic base such as ammonia, triethylamine, trimethylamine, dimethylaminoethanol, diethylaminoethanol, and the like. The basic compounds may be used alone or in combination of two or more.

Further, the 50% particle diameter (D50) of the binding resin fine particles in the aqueous dispersion of the resin fine particles based on the volume distribution is preferably 0.05 μm to 1.0 μm and more preferably 0.05 μm to 0.4 μm. By adjusting the 50% particle diameter (D50) based on the volume distribution to the above range, it becomes easy to obtain toner particles having a volume average particle diameter of 3 μm to 10 μm, which is appropriate for toner particles.

A dynamic light scattering type particle diameter distribution meter Nanotrack UPA-EX150 (manufactured by Nikkiso Co., Ltd.) is used to measure the 50% particle diameter (D50) based on the volume distribution.

Colorant Fine Particle-Dispersed Solution

The colorant fine particle-dispersed solution to be used as needed can be prepared by the known method described hereinbelow, but is not limited to this method. Thus, the colorant fine particle-dispersed solution can be prepared by mixing a colorant, an aqueous medium and a dispersant with a mixer such as a known stirrer, emulsifier, and disperser. As the dispersant used here, known substances such as a surfactant and a polymer dispersant can be used.

Both the surfactant and the polymer dispersant can be removed in the washing step described hereinbelow, but the surfactant is preferable from the viewpoint of washing efficiency.

Examples of the surfactant include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like.

Among these, nonionic surfactants and anionic surfactants are preferable. Further, a nonionic surfactant and an anionic surfactant may be used in combination. The surfactants may be used alone or in combination of two or more. The concentration of the surfactant in the aqueous medium is preferably 0.5% by mass to 5% by mass.

The amount of the colorant fine particles in the colorant fine particle-dispersed solution is not particularly limited, but is preferably 1% by mass to 30% by mass with respect to the total mass of the colorant fine particle-dispersed solution.

Further, as for the dispersed particle diameter of the colorant fine particles in the aqueous dispersion of the colorant, from the viewpoint of dispersibility of the colorant in the finally obtained toner, the 50% particle diameter (D50) based on the volume distribution is preferably 0.5 μm or less. For the same reason, it is preferable that the 90% particle diameter (D90) based on the volume distribution be 2 μm or less. The dispersed particle diameter of the colorant fine particles dispersed in the aqueous medium is measured by a dynamic light scattering type particle diameter distribution meter (Nanotrack UPA-EX150: manufactured by Nikkiso Co., Ltd.).

Examples of a mixer such as a known stirrer, emulsifier, and disperser to be used to disperse the colorant in an aqueous media include an ultrasonic homogenizer, a jet mills, a pressure homogenizer, a colloid mill, a ball mill, a sand mill, and a paint shaker. These may be used alone or in combination.

Release Agent (Aliphatic hydrocarbon compound) Fine Particle-Dispersed Solution

If necessary, a release agent fine particle-dispersed solution may be used. The release agent fine particle-dispersed solution can be prepared by the known method described below, but is not limited to this method.

The release agent fine particle-dispersed solution can be produced by adding release agent to an aqueous medium including a surfactant, heating above the melting point of the release agent, dispersing into a particulate form with a homogenizer having a strong shearing ability (for example, "CLEARMIX W MOTION" manufactured by M-Technique Co., Ltd. and a pressure discharge type disperser (for example, "GAULIN HOMOGENIZER" manufactured by Gaulin Co., Ltd.), and then cooling to a temperature below the melting point.

As for the dispersed particle diameter of the release agent fine particle-dispersed solution in the aqueous release agent-dispersed solution, the 50% particle diameter (D50) based on the volume distribution is preferably 0.03 μm to 1.0 μm and more preferably 0.1 μm to 0.5 μm. Further, it is preferable that there are no coarse particles of 1 μm or more.

When the dispersed particle diameter of the release agent fine particle-dispersed solution is within the above range, the release agent can be present in the toner in a finely dispersed state, the exuding effect at the time of fixing is maximized, and good separability can be obtained. The dispersed particle diameter of the release agent fine particle-dispersed solution obtained by dispersing in the aqueous medium can be measured with a dynamic light scattering type particle diameter distribution meter (Nanotrack UPA-EX150: manufactured by Nikkiso).

Mixing Step

In the mixing step, a mixed liquid is prepared by mixing the resin fine particle-dispersed solution and, if necessary, at least one of the release agent fine particle-dispersed solution and the colorant fine particle-dispersed solution. It is possible to use a well-known mixing apparatus, such as a homogenizer or a mixer.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant and applying heat and/or a mechanical force as appropriate if necessary, aggregates are formed through aggregation of resin fine particles and, if necessary, release agent fine particles and/or colorant fine particles.

Examples of flocculants include organic flocculants, such as quaternary salt type cationic surfactants and polyethyleneimines; and inorganic flocculants, such as inorganic metal salts such as sodium sulfate, sodium nitrate, sodium chloride, calcium chloride and calcium nitrate; inorganic ammonium salts such as ammonium sulfate, ammonium chloride and ammonium nitrate; and divalent or higher metal complexes. In addition, an acid may be added in order to lower the pH and achieve soft aggregation, and sulfuric acid, nitric acid, or the like, can be used.

The flocculant may be added in the form of a dry powder or an aqueous solution dissolved in an aqueous medium, but adding the flocculant in the form of an aqueous solution is preferred in order to bring about uniform aggregation. In addition, it is preferable for the flocculant to be added and mixed at a temperature that is not higher than the glass transition temperature or melting point of the resin contained in the mixed solution. By mixing under these temperature conditions, aggregation progresses relatively uniformly. When mixing the flocculant in the mixed solution, it is possible to use a well-known mixing apparatus, such as a homogenizer or a mixer. The aggregation step is a step in which toner particle-sized aggregates are formed in the aqueous medium. The volume average particle diameter of aggregates produced in the aggregation step is preferably 3 to 10 μm. The volume average particle diameter can be measured using a particle size distribution analyzer that uses the Coulter principle (a Coulter Multisizer III: produced by Beckman Coulter, Inc.).

Step for Obtaining Dispersed Solution Containing Toner Particles (Fusion Step)

In the fusion step, aggregation is first stopped in the dispersed solution containing aggregates obtained in the aggregation step while agitating in the same way as in the aggregation step. The aggregation is stopped by adding an aggregation-stopping agent able to adjust the pH, such as a base, a chelate compound or an inorganic compound such as sodium chloride.

After the dispersed state of aggregated particles in the dispersed solution has stabilized as a result of the action of the aggregation-stopping agent, the aggregated particles are fused and a desired particle diameter is achieved by being heated to a temperature that is not lower than the glass transition temperature or melting point of the binder resin. Moreover, the 50% particle diameter on a volume basis (D50) of the toner particles is preferably 3 to 10 μm.

Cooling Step

If necessary, the temperature of the dispersed solution containing the toner particles obtained in the fusion step is lowered in the cooling step to a temperature that is lower than the crystallization temperature and/or glass transition temperature of the binder resin.

Post-Treatment Steps

In the toner production method, post-treatment steps such as a washing step, a solid-liquid separation step and a drying step may be carried out after the cooling step, and toner particles can be obtained in a dry state by carrying out these post-treatment steps.

External Addition Step

In the external addition step, the toner particle obtained in the drying step is externally treated with an external additive. The external additive can be the external additive A or the external additive B. The external additive preferably contains inorganic fine particles. Specific examples of external additives include inorganic fine particles, such as silica fine particles, alumina fine particles, titanium oxide fine particles and strontium titanate fine particles, and resin fine particles, such as fine particles of vinyl-based resins, polyester resins and silicone resins. It is preferable to add these external additives while, for example, applying a shearing force in a dried state.

The external additive is preferably at least one type of inorganic fine particles selected from the group consisting of silica fine particles, alumina fine particles, titanium oxide fine particles, strontium titanate fine particles, and the like. The external additive preferably contains strontium titanate fine particles. In addition, the external additive preferably contains strontium titanate fine particles and silica fine particles. The content of strontium titanate fine particles in the external additive is preferably 5 to 70 mass %, and more preferably 10 to 55 mass %. The content of silica fine particles in the external additive is preferably 30 to 95 mass %, and more preferably 45 to 90 mass %.

The method for producing inorganic fine particles such as strontium titanate fine particles is not limited, and these can be produced using a well-known method disclosed in Japanese Patent Application Publication No. 2015-84095 etc.

The external additive may be surface treated using a silane coupling agent, a silicone oil, or the like. From the perspective of charge amount, the external additive preferably contains inorganic fine particles that have been surface treated with a fluorine-containing surface treatment agent, such as a fluorine-containing silane coupling agent or a fluorine-modified silicone oil. The external additive more preferably contains inorganic fine particles that have been surface treated with a fluorine-containing silane coupling agent. The external additive more preferably contains inorganic fine particles that have been surface treated with a fluorine-containing silane coupling agent and a silane coupling agent that does not contain fluorine.

Examples of fluorine-containing silane coupling agents include 3,3,3-trifluoropropylmethyldimethoxysilane, 3,3,3-trifluoropropylmethyldiethoxysilane, 3,3,3-trifluoropropyltrimethoxysilane, 3,3,3-trifluoropropyltriethoxysilane, perfluorooctylethyltriethoxysilane and 1,1,1-trifluorohexyldiethoxysilane.

Examples of silane coupling agents that do not contain fluorine include methyltrimethoxysilane, ethyltrimethoxysilane, dimethyldimethoxysilane, phenyltrimethoxysilane, propyltrimethoxysilane, isobutyltrimethoxysilane, methyltriethoxysilane, dimethyldiethoxysilane, phenyltriethoxysilane, propyltriethoxysilane and isobutyltriethoxysilane.

The surface treatment method is not particularly limited, and a well-known method can be used. An example thereof includes a method comprising placing inorganic fine particles in a vessel equipped with a stirring device, such as a Henschel mixer, stirring while purging with nitrogen, spraying a surface treatment agent so as to be mixed with the inorganic fine particles, and then heating so as to bring about a reaction. The type and amount of surface treatment agent should be altered, as appropriate, according to the desired charge quantity. The amount thereof is preferably approximately 2 to 10 parts by mass relative to 100 parts by mass of the inorganic fine particles. It is particularly preferable to use 3,3,3-trifluoropropylmethyldimethoxysilane and isobutyltrimethoxysilane.

The toner particle production method preferably has a shell formation step, which is carried out after obtaining toner particles (core particles) using any of the production methods described above and which comprises further adding resin fine particles containing a shell-forming resin to an aqueous dispersion in which the core particles are dispersed so as to cause the resin fine particles to adhere to the core particles and form a shell. A toner production method that uses an emulsion aggregation method preferably has a shell formation step, which is carried out after forming aggregated particles (core particles) in the aggregation step and which comprises further adding resin fine particles containing a shell-forming resin so as to cause the resin fine particles to adhere to the core particles and form a shell. That is, the toner particle preferably has a core particle that contains the binder resin and a shell on the surface of the core particle. The shell-forming resin may be the same as, or different from, a resin used as the binder resin. The added quantity of the shell-forming resin is preferably 1 to 10 parts by mass, and more preferably 2 to 7 parts by mass, relative to 100 parts by mass of the binder resin contained in the core particles.

In this case, the toner production method preferably has the following steps.

(1) a dispersion step for preparing a dispersed solution of binder resin fine particles that contain the binder resin, (2-1) an aggregation step for aggregating binder resin fine particles contained in the dispersed solution of binder resin fine particles so as to form aggregates, (2-2) a shell formation step for further adding resin fine particles containing a shell-forming resin to the dispersed solution containing the aggregates, causing the resin fine particles to adhere to the aggregates, and forming aggregates having a shell, and (3) a fusion step for heating and fusing the aggregates having a shell formed thereon.

In addition, in order for the boric acid to be easily incorporated near the toner particle surface, it is preferable to add a boric acid source together with the resin fine particles containing the shell-forming resin to the dispersed solution containing aggregates in step (2-2).

The boric acid source may be boric acid or a compound that can be converted into boric acid by, for example, controlling the pH during production of the toner. For example, it is possible to use at least one substance selected from the group consisting of boric acid, borax, organic boric acids, boric acid salts, boric acid esters, and the like. For example, it is possible to add a boric acid source and control so that boric acid is contained in the aggregates. It is preferable to attain acidic pH conditions in the aggregation step (2-1) and then carry out the shell formation step.

The boric acid may be present in an unsubstituted state in the aggregates. The boric acid source is preferably at least one substance selected from the group consisting of boric acid and borax. In a case where the toner is produced in an aqueous medium, it is preferable to add the boric acid as a boric acid salt from the perspectives of reactivity and production stability. Specifically, the boric acid source is more preferably at least one substance selected from the group consisting of sodium tetraborate, borax, ammonium borate, and the like, and is further preferably borax.

Because borax is sodium tetraborate ($Na_2B_4O_7$) decahydrate and is converted into boric acid in acidic aqueous solutions, it is preferable to use borax in a case where the boric acid is used in an acidic environment in an aqueous medium. The method of addition may comprise adding the borax in the form of a dry powder or an aqueous solution dissolved in an aqueous medium, but adding the borax in the form of an aqueous solution is preferred in order to bring about uniform aggregation. The concentration of the aqueous solution should be altered, as appropriate, according to the concentration to be contained in the toner, and is, for example, 1 to 20 mass %. In order to convert the borax into boric acid, it is preferable to attain acidic pH conditions before the addition, during the addition or after the addition. For example, the pH should be regulated to 1.5 to 5.0, and preferably 2.0 to 4.0. The pH is preferably regulated before the aggregation step for forming aggregates. That is, it is preferable to attain acidic pH conditions before the aggregation step in the mixing step in which the dispersed solution of binder resin fine particles and, if necessary, other dispersed solutions such as the release agent fine particle-dispersed solution are mixed.

Methods for measuring physical property values will now be described.

When measuring the content of boric acid contained in the toner particle, measurements are carried out using fluorescence X-Ray measurements, and the content is determined using a calibration curve. Fluorescence X-Ray measurements of boron are carried out in accordance with JIS K 0119-1969, but are specifically carried out in the following way.

A wavelength-dispersive X-Ray fluorescence analysis apparatus (Axios produced by PANalytical) is used as the measurement apparatus, and dedicated software for this apparatus (SuperQ ver.4.0F produced by PANalytical) is used in order to set measurement conditions and analyze measured data. Moreover, Rh is used as the X-Ray bulb anode, the measurement atmosphere is a vacuum, the measurement diameter (collimator mask diameter) is 27 mm, and the measurement time is 10 seconds. In addition, detection is carried out using a proportional counter (PC) when measuring boron, which is a light element.

4 g of toner particles was placed as a measurement sample in a dedicated aluminum ring for pressing, leveled off, pressurized for 60 seconds at a pressure of 20 MPa using a "BRE-32" tablet compression molder (produced by Maekawa Testing Machine MFG. Co., Ltd.), and molded into a pellet having a thickness of approximately 2 mm and a diameter of approximately 39 mm, and when PET is used as a spectral crystal, the count rate (units: cps) of B-Kα radiation observed at a diffraction angle (2θ) of 41.75° is measured.

In this case, the accelerating voltage of the X-Ray generator is 32 kV, and the current is 125 mA.

In addition, the amount (mass %) of boric acid in the toner particle is determined from a separately prepared boric acid calibration curve.

Measurements can be carried out using toner particles obtained by removing the external additives from the toner using the following method.

A concentrated sucrose solution is prepared by adding 160 g of sucrose (produced by Kishida Chemical Co., Ltd.) to 100 mL of ion exchanged water and dissolving the sucrose while immersing in hot water. 31 g of the concentrated sucrose solution and 6 mL of Contaminon N (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) are placed in a centrifugal separation tube (capacity 50 mL). 1.0 g of toner is added to this and lumps of the toner are broken into smaller pieces using a spatula or the like. The centrifugal separation tube is shaken for 20 minutes at a rate of 300 spm (strokes per min) using a shaker (AS-1N produced by As One Corporation). Following the shaking, the solution is transferred to a (50 mL) swing rotor glass tube and subjected to separation for 30 minutes at 3500 rpm using a centrifugal separator (H-9R, produced by Kokusan Co., Ltd.).

Toner particles are separated from external additives in this procedure. It is confirmed by eye whether toner particles have been sufficiently separated from the aqueous solution, and toner particles separated into the uppermost layer are collected using a spatula or the like. A measurement sample is obtained by filtering the collected toner particles using a vacuum filtration device and then drying for 1 hour or longer using a dryer. This procedure is carried out multiple times in order to ensure the required amount.

Identification and Quantification of Boric Acid Contained in Toner Particle

Identification and content measurement of boric acid contained in the toner particle are carried out using the following method. Moreover, the toner particle obtained by removing the external additives from the toner using the method described above can be used as a sample.

In IR analysis, measurements are carried out by means of an ATR method using a Spectrum One (Fourier transform infrared spectroscopy analyzer produced by PerkinElmer) equipped with a Universal ATR Sampling Accessory. The specific measurement procedure is as follows.

The incidence angle of infrared light ($\lambda$=5 μm) is set to 45°. A Ge ATR crystal (refractive index 4.0) is used as an ATR crystal. Other conditions are as follows.

Range

Start: 4000 $cm^{-1}$

End: 650 (Ge ATR crystal)

Duration

Scan number: 16

Resolution: 4.00 $cm^{-1}$

Advanced: $CO_2/H_2O$ correction carried out (1) A Ge ATR crystal (refractive index=4.0) is attached to an apparatus.

(2) Scan type is set to Background, Units are set to EGY, and background measurements are carried out.

(3) Scan type is set to Sample, and Units are set to A.

(4) 0.01 g of toner particles is precisely weighed out onto the ATR crystal.

(5) The sample is pressurized using a pressurizing arm. (Force Gauge: 90)

(6) The sample is measured.

It is confirmed whether or not an absorption peak is present at 1380 $cm^{-1}$ in the absorption spectrum. In a case where an absorption peak is detected at 1380 $cm^{-1}$, it is assessed that a peak corresponding to boric acid has been detected.

In addition, it is possible to confirm whether or not boron derived from boric acid is present in an observed cross section by carrying out elemental analysis by means of energy dispersive X-Ray spectroscopy (EDX) using a transmission electron microscope (TEM).

Toner Detachment Treatment A 20 g of "Contaminon N" (a 10 mass % aqueous solution of a neutral detergent for cleaning precision measurement equipment, which has a pH of 7 and comprises a non-ionic surfactant, an anionic surfactant and an organic builder) is weighed out into a vial having a capacity of 50 mL, and mixed with 1 g of toner.

The vial is placed on a KM Shaker (model: V.SX) produced by Iwaki Sangyo Co., Ltd., the speed is set to 50, and the vial is shaken for 300 seconds. An external additive that detaches from the toner and migrates to the liquid side as a result of this procedure is the external additive A.

Next, the toner and the external additive A, which has migrated to the supernatant liquid, are separated using a centrifugal separator (a H-9R produced by Kokusan Co., Ltd.) (5 minutes at 16.67 $s^{-1}$). The precipitated toner is removed and dried by means of vacuum drying (24 hours at 40° C.), and only the external additive A is collected.

Toner Detachment Treatment B 20 g of "Contaminon N" (a 10 mass % aqueous solution of a neutral detergent for cleaning precision measurement equipment, which has a pH of 7 and comprises a non-ionic surfactant, an anionic surfactant and an organic builder) is weighed out into a vial having a capacity of 50 mL, and mixed with 1 g of toner.

The vial is placed on a KM Shaker (model: V.SX) produced by Iwaki Sangyo Co., Ltd., the speed is set to 50, and the vial is shaken for 30 seconds. An external additive that detaches from the toner and migrates to the liquid side as a result of this procedure is the external additive B.

Next, the toner and the external additive B, which has migrated to the supernatant liquid, are separated using a centrifugal separator (a H-9R produced by Kokusan Co., Ltd.) (5 minutes at 16.67 $s^{-1}$). The precipitated toner is removed and dried by means of vacuum drying (24 hours at 40° C.), and only the external additive B is collected.

Content of External Additive A and External Additive B, and Proportion of External Additive B Detachment treatments A and B are carried out in the manner described above, and the content values of the external additive A and the external additive B and the ratio (mass %) of the external additive B relative to the external additive A are calculated on the basis of the acquired values for the amounts of the external additive A and the external additive B.

Measurement of Charge Amount of External Additive A Using Standard Carrier (F81)

0.10 g of the external additive A and 1.90 g of a prescribed carrier (an Imaging Society of Japan standard carrier: F81) are placed in a plastic bottle having a lid, and the bottle is then left for 5 days in an environment having a temperature of 23.0° C. and a relative humidity of 50%.

The lid is closed on the plastic bottle containing the carrier and the external additive A, the bottle is shaken for 1 minute at a speed of 4 reciprocations per second using a shaker (a YS-LD produced by Yayoi Co., Ltd.), and the mixture of the carrier and the external additive A is charged.

The FIGURE is a schematic view of an apparatus for measuring charge quantity. 0.3 g of the triboelectrically charged mixture is placed in a metal measurement container 2, in the bottom of which is a screen 3 having an opening size of 20 μm, and a metal lid 4 is then placed on the measurement container. At this point, the mass of the overall measurement container 2 is measured precisely and denoted by W1 (g).

Next, suction is carried out from a suction port 7 in a suction device 1 (a part adjacent to the measurement container 2 is at least an insulator), and an air quantity control valve 6 is adjusted so that the pressure on a vacuum gauge 5 is 2.5 kPa within 10 seconds. Moreover, the length of time between measuring W1and initiating suction is 30 seconds or less. The external additive A is removed by carrying out suction in this state for 2 minutes. At this point, the charge quantity accumulated in a capacitor 8 is denoted by Q (μC). 9 is a potentiometer. In addition, the mass of the overall measurement container following the suction is measured precisely and denoted by W2 (g). The charge amount (μC/g) of the external additive A is calculated using the formula below.

Charge amount of external additive A using standard carrier (F81)=Q/(W1−W2)

Method for Measuring Number Average Particle Diameter of External Additive

The particle diameter of the external additive is measured using a "S-4800" scanning electron microscope (produced by Hitachi, Ltd.). Lengths (major axis diameter) of primary particles of the external additive are measured in a field of view magnified at a maximum magnification rate of 200,000 times, and the number average particle diameter is determined. The magnification rate is adjusted as appropriate according to the size of the external additive.

Measurement of Weight Average Particle Diameter (D4) And Number Average Particle Diameter (D1) of Toner And Toner Particle Using a Multisizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multisizer 3 Version 3.51 software (Beckman Coulter, Inc.) for setting measurement conditions and analyzing measurement data, measurement is performed with 25000 effective measurement channels, and the measurement data are analyzed to calculate the weight-average particle diameter (D4) and number average particle diameter (D1) of the toner particle or toner.

The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 μA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm. The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counter-clockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner or toner particle is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner or toner particle dispersed therein is dripped with a pipette into the round-bottomed beaker of (1) set on the sample stand, and adjusted to a measurement concentration of about 5%. Measurement is then performed until the number of measured particles reaches 50000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software, and the number-average particle diameter (D1) is the "Average diameter" on the "Analysis/Count statistical value (arithmetic mean)" screen when Graph/number % is set in the dedicated software.

Examples

The present invention will now be explained in greater detail by means of the following production examples and working examples, but is in no way limited to these examples. Numbers of parts used in formulations in the working examples mean parts by mass unless explicitly indicated otherwise.

Production Example of Toner Particle 1

Synthesis of Polyester Resin 1

- Adduct of 2 moles of ethylene oxide of bisphenol A: 9 parts by mole
- Adduct of 2 moles of propylene oxide of bisphenol A: 95 parts by mole
- Terephthalic acid: 50 parts by mole
- Fumaric acid: 30 parts by mole
- Dodecenylsuccinic acid: 25 parts by mole The monomers listed above were charged in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at a quantity of 1.0 parts relative to 100 parts of the monomers. The temperature was increased from 195° C. to 250° C. over a period of 5 hours while distilling off water that had been generated, and a dehydrating condensation reaction was carried out for a further 2 hours at 250° C.

Obtained thereby was polyester resin 1, which had a glass transition temperature of 60.2° C., an acid value of 16.8 mg KOH/g, a hydroxyl value of 28.2 mg KOH/g, a weight average molecular weight of 11200 and a number average molecular weight of 4100.

Synthesis of Polyester Resin 2

- Adduct of 2 moles of ethylene oxide of bisphenol A: 48 parts by mole
- Adduct of 2 moles of propylene oxide of bisphenol A: 48 parts by mole
- Terephthalic acid: 65 parts by mole
- Dodecenylsuccinic acid: 30 parts by mole The monomers listed above were placed in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at a quantity of 0.7 parts relative to 100 parts of the monomers. The temperature was increased from 195° C. to 240° C. over a period of 5 hours while distilling off water that had been generated, and a dehydrating condensation reaction was carried out for a further 2 hours at 240° C. The temperature was then lowered to 190° C., 5 parts by mole of trimellitic anhydride was added gradually, and a reaction was allowed to continue for 1 hour at 190° C.

Obtained thereby was polyester resin 2, which had a glass transition temperature of 55.2° C., an acid value of 14.3 mg KOH/g, a hydroxyl value of 24.1 mg KOH/g, a weight average molecular weight of 43600 and a number average molecular weight of 6200.

Preparation of Resin Particle-Dispersed Solution 1

Polyester resin 1: 100 parts

Methyl ethyl ketone: 50 parts

Isopropyl alcohol: 20 parts

The methyl ethyl ketone and isopropyl alcohol were placed in a container. A polyester resin 1-dissolved solution was then obtained by gradually adding the resin and stirring so as to completely dissolve the resin. The temperature of the container holding this polyester resin 1-dissolved solution was set to 65° C., a total of 5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 1 of polyester resin 1 was then obtained by removing the solvent under reduced pressure using an evaporator. The volume average particle diameter of these resin particles was 135 nm. In addition, the amount of resin particle solid content was adjusted to 20% using ion exchanged water.

Preparation of Resin Particle-Dispersed Solution 2

Polyester resin 2: 100 parts

Methyl ethyl ketone: 50 parts

Isopropyl alcohol: 20 parts

The methyl ethyl ketone and isopropyl alcohol were placed in a container. A polyester resin 2-dissolved solution was then obtained by gradually adding the materials listed above and stirring so as to completely dissolve the materials. The temperature of the container holding this polyester resin 2-dissolved solution was set to 40° C., a total of 3.5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 2 of polyester resin 2 was then obtained by removing the solvent under reduced pressure. The volume average particle diameter of these resin particles was 155 nm. In addition, the amount of resin particle solid content was adjusted to 20% using ion exchanged water.

Preparation of Colorant Particle-Dispersed Solution

Copper phthalocyanine (Pigment Blue 15:3): 45 parts

Ionic surfactant (Neogen RK produced by Dai-ichi Kogyo Seiyaku Co., Ltd.): 5 parts Ion exchanged water: 190 parts The components listed above were mixed, dispersed for 10 minutes using a homogenizer (an Ultratarax produced by IKA), and then subjected to a dispersion treatment for 20 minutes at a pressure of 250 MPa using an Ultimizer (a counter-impact wet grinding mill produced by Sugino Machine Limited) to obtain a colorant particle-dispersed solution which had a solids content of 20% and in which the volume average particle diameter of colored particles was 120 nm.

Preparation of Release Agent Particle-Dispersed Solution

Release agent (hydrocarbon wax; melting point 79° C.): 15 parts

Ionic surfactant (Neogen RK produced by Dai-ichi Kogyo Seiyaku Co., Ltd.): 2 parts Ion exchanged water: 240 parts The components listed above were heated to 100° C., thoroughly dispersed using an Ultratarax T50 produced by IKA, heated to 115° C. using a pressure discharge type Gaulin homogenizer, and subjected to a dispersion treatment for 1 hour to obtain a release agent particle-dispersed solution having a volume average particle diameter of 160 nm and a solids content of 20%.

Production of toner Particle 1

Resin particle-dispersed solution 1: 500 parts

Resin particle-dispersed solution 2: 400 parts

Colorant particle-dispersed solution: 50 parts

Release agent particle-dispersed solution: 80 parts

As a core formation step, the materials listed above were first placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. It was confirmed whether the volume average particle diameter of the formed aggregated particles was suitable using a Coulter Multisizer III, and when aggregated particles (cores) having a size of 5.0 μm had been formed, the materials listed below were introduced and stirred for 1 hour to form a shell as a shell formation step.

Resin particle-dispersed solution 1: 40 parts

Ion exchanged water: 300 parts 10.0 mass % aqueous solution of borax: 19 parts (Borax: sodium tetraborate decahydrate produced by FUJIFILM Wako Pure Chemical Corporation)

The pH was then adjusted to 9.0 using a 5% aqueous solution of sodium hydroxide, and the solution was heated to 89° C. while continuing the stirring. When a desired surface form was obtained, the heating was stopped, the particles were cooled to 25° C., filtration and solid-liquid separation were carried out, and the particles were washed with ion exchanged water. Following completion of the washing, toner particles 1 having a weight-average particle diameter (D4) of 6.8 μm were obtained by drying with a vacuum dryer. Physical properties of obtained toner particle 1 are shown in Table 1.

Production Examples of Toner Particles 2 to 6 and 11

Toner particles 2 to 6 and 11 were obtained in the same way as toner particle 1, except that the formulation and conditions were changed to those shown in Table 1. Physical properties are shown in Table 1.

Production Example of Toner Particle 7

Resin particle-dispersed solution 1: 350.0 parts

Release agent particle-dispersed solution: 50.0 parts

Colorant particle-dispersed solution: 80.0 parts

Ion exchanged water: 160.0 parts

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. It was confirmed whether the volume average particle diameter of the formed aggregated particles was suitable using a Coulter Multi sizer III, and when aggregated particles having a volume average particle diameter of 4.0 μm were formed, 19.0 parts of a 10.0 mass % aqueous solution of borax was added. Following the addition of borax, 150.0 parts of resin particle-dispersed solution 1 was added, the volume average particle diameter of the aggregated particles was confirmed again, and when aggregated particles having a volume average particle diameter of 6.0 μm had been formed, the pH was adjusted to 9.0 using a 5% aqueous solution of sodium hydroxide. The solution was then heated to 75° C. while continuing the stirring. The aggregated particles were fused together by maintaining a temperature of 75° C. for 1 hour.

Crystallization of the polymer was then facilitated by cooling to 50° C. and maintaining this temperature for 3 hours.

The aggregated particles were then cooled to 25° C., filtered, subjected to solid-liquid separation, and then washed with ion exchanged water. Following completion of the washing, toner particles 7 were obtained by drying the filtered product using a vacuum dryer. Physical properties are shown in Table 1.

Production Example of Toner Particle 8

Toner particle 8 was obtained in the same way as in the production example of toner particle 1, except that the aqueous solution of borax was replaced with 12.0 parts of a 10.0 mass % aqueous solution of boric acid (boric acid; $H_3BO_3$ produced by FUJIFILM Wako Pure Chemical Corporation). Physical properties are shown in Table 1.

Production Example of Toner Particle 9

710 parts of ion exchanged water and 850 parts of a 0.1 mol/L aqueous solution of $Na_3PO_4$ were added to a four mouth container, and the container was held at a temperature of 60° C. while the contents of the vessel were stirred at a speed of 12,000 rpm using a T.K. Homomixer. 68 parts of a 1.0 mol/L aqueous solution of $CaCl_2$ was then added slowly to prepare an aqueous dispersion medium containing an ultrafine poorly water-soluble dispersion stabilizer ($Ca_3(PO_4)_2$).

Styrene: 76 parts
n-butyl acrylate: 24 parts
C.I. Pigment Blue 15:3 (produced by Dainichiseika Color and Chemicals Mfg. Co., Ltd.): 6.5 parts
Polyester resin (1): 5 parts
(Terephthalic acid-propylene oxide-modified bisphenol A (2 mole adduct) (molar ratio=51:50), acid value=10 mg KOH/g, glass transition temperature=70° C., Mw=10500, Mw/Mn=3.20)
Negative charge control agent (aluminum 3,5-di-tert-butylsalicylate compound): 0.4 parts
Fischer Tropsch wax (maximum endothermic peak temperature: 75° C.): 7.5 parts
10.0 mass % aqueous solution of borax: 19.0 parts A monomer mixture was prepared by stirring the materials listed above for 3 hours using an attritor and dispersing the components in the polymerizable monomers. A polymerizable monomer composition was prepared by adding 10.0 parts (of a 50% toluene solution) of 1,1,3,3-tetramethylbutylperoxy-2-ethyl hexanoate, which is a polymerization initiator, to the monomer mixture. The polymerizable monomer composition was introduced into an aqueous dispersion medium, and granulation was carried out for 5 minutes while maintaining the rotational speed of the stirrer at 10,000 rpm. The high-speed stirrer was then replaced with a propeller type stirrer, the internal temperature was increased to 70° C., and a reaction was allowed to progress for 6 hours under gentle stirring.

Next, the temperature inside the vessel was increased to 80° C. and maintained for 4 hours, after which a slurry was obtained by cooling gradually to 30° C. at a cooling rate of 1° C./min. Dilute hydrochloric acid was added to the vessel containing the slurry, and the dispersion stabilizer was removed. Toner particle 9 was then obtained by filtering, washing and drying. Physical properties of toner particle 9 are as shown in Table 1.

Production Example of Toner Particle 10

Polyester resin 1: 60.0 parts
Polyester resin 2: 40.0 parts
Copper phthalocyanine pigment (Pigment Blue 15:3): 6.5 parts
Release agent (hydrocarbon wax; melting point 79° C.): 5.0 parts
Plasticizer (ethylene glycol distearate): 15.0 parts
Boric acid powder (produced by FUJIFILM Wako Pure Chemical Corporation): 1.5 parts The materials listed above were pre-mixed using an FM mixer (produced by Nippon Coke & Engineering Co., Ltd.), and then melt kneaded using a twin screw kneading extruder (PCM-30 produced by Ikegai Corporation). The obtained kneaded product was cooled and coarsely pulverized using a hammer mill, 130 parts of ethyl acetate was added, and the product was heated to 80° C., stirred for 1 hour at a rotational speed of 5000 rpm using a T.K. Homomixer (produced by Tokushu Kika Kogyo Co., Ltd.), and then cooled to 30° C. to obtain a dissolved solution.

400 parts of water and 5 parts of Eleminol MON-7 (produced by Sanyo Chemical Industries, Ltd.) were placed in a separate container, the temperature was adjusted to 30° C., 100 parts of the dissolved solution mentioned above was added while stirring at a rotational speed of 13000 rpm using a T.K. Homomixer (produced by Tokushu Kika Kogyo Co., Ltd.), and stirring was continued for a further 20 minutes to obtain a slurry. Toner particle 10 was obtained by removing the solvent for 8 hours at 30° C. under reduced pressure while gently stirring the slurry, then carrying out an aging treatment for 4 hours at 45° C., and then washing, filtering and drying.

Physical properties of the obtained toner particle are shown in Table 1.

TABLE 1

| Toner particle No. | Toner production method | Boric acid component/ number of added parts | | Boron fluorescence X-Ray intensity (kcps) | Weight average particle diameter (D4) μm |
|---|---|---|---|---|---|
| 1 | Emulsion aggregation | 10.0 mass % aqueous solution of borax | 19.0 | 0.15 | 6.1 |

TABLE 1-continued

| Toner particle No. | Toner production method | Boric acid component/ number of added parts | | Boron fluorescence X-Ray intensity (kcps) | Weight average particle diameter (D4) μm |
|---|---|---|---|---|---|
| 2 | Emulsion aggregation | 10.0 mass % aqueous solution of borax | 57.0 | 0.25 | 6.2 |
| 3 | Emulsion aggregation | 10.0 mass % aqueous solution of borax | 9.1 | 0.10 | 6.2 |
| 4 | Emulsion aggregation | 10.0 mass % aqueous solution of borax | 3.6 | 0.09 | 6.2 |
| 5 | Emulsion aggregation | 40.0 mass % aqueous solution of borax | 51.0 | 0.60 | 6.2 |
| 6 | Emulsion aggregation | 40.0 mass % aqueous solution of borax | 56.0 | 0.63 | 6.1 |
| 7 | Emulsion aggregation | 10.0 mass % aqueous solution of borax | 19.0 | 0.30 | 6.2 |
| 8 | Emulsion aggregation | 10 mass % aqueous solution of boric acid | 12.0 | 0.15 | 6.2 |
| 9 | Suspension | 10.0 mass % aqueous solution of borax | 19.0 | 0.15 | 6.4 |
| 10 | Pulverization | Boric acid powder | 1.5 | 0.09 | 7.0 |
| 11 | Emulsion aggregation | — | 0.0 | 0.00 | 6.3 |

A peak corresponding to boric acid was observed when toner particles 1 to 10 were subjected to ATR-IR analysis using germanium. Said peak was not detected with toner particle 11.

Production Example of Strontium Titanate Particles

Meta-titanic acid produced using the sulfuric acid method was subjected to iron removal and bleaching, after which a 3 mol/L aqueous solution of sodium hydroxide was added, the pH was adjusted to 9.0, desulfurization treatment was carried out, and the meta-titanic acid was then neutralized to a pH of 5.6 by means of 5 mol/L hydrochloric acid, filtered and then washed with water. Water was added to the washed cake so as to obtain a slurry containing 1.90 mol/L of $TiO_2$, after which the pH was adjusted to 1.4 by means of hydrochloric acid, and a deflocculation treatment was carried out.

1.90 mol (in terms of $TiO_2$) of desulfurized and deflocculated meta-titanic acid was obtained and placed in a 3 L reaction vessel. 2.185 mol of an aqueous solution of strontium chloride was added to the deflocculated meta-titanic acid slurry so that the $SrO/TiO_2$ molar ratio was 1.15, and the $TiO_2$ concentration was then adjusted to 1.039 mol/L.

Next, the temperature was increased to 90° C. while stirring and mixing, 440 mL of a 10 mol/L aqueous solution of sodium hydroxide was added over a period of 40 minutes, stirring was then continued at 95° C. for a further 45 minutes, and the reaction was then terminated through rapid cooling by introducing the slurry into ice water.

This reaction slurry was heated to 70° C., 12 mol/L hydrochloric acid was added until the pH reached 5.0, stirring was continued for 1 hour, and the obtained precipitate was decanted to obtain a slurry containing strontium titanate.

Production Example of Silica Particles

A silica fine particle raw material (fumed silica; volume average particle diameter of primary particles: 60 nm) was placed in an autoclave equipped with a stirrer and heated to 200° C. in a fluidized state achieved by means of stirring. The autoclave was purged with nitrogen and then sealed, after which hexamethyldisilazane (HMDS) was sprayed into the autoclave at an amount of 10 parts relative to 100 parts of the silica fine particle raw material, and the fine particles were fluidized and surface treated with the silane compound. This reaction was continued for 60 minutes and then terminated. Following completion of the reaction, the autoclave was depressurized and cleaned with a nitrogen gas stream, and excess hexamethyldisilazane and by-products were removed from the hydrophobically treated silica fine particles.

Production Example of External Additive 1

A slurry containing the obtained strontium titanate was adjusted to a temperature of 40° C. and adjusted to a pH of 2.5 through addition of hydrochloric acid, after which 4.5 parts of 3,3,3-trifluoropropylmethyldimethoxysilane and 4.5 parts of isobutyltrimethoxysilane were added to 100 parts of solid content and stirred for 10 hours. A 5 mol/L aqueous solution of sodium hydroxide was added so as to adjust the pH to 6.5, stirring was continued for 1 hour, the slurry was then filtered and washed, and the obtained cake was dried for 8 hours in air at a temperature of 120° C. External additive 1 was then obtained by pulverizing the dried cake.

Production Examples of External Additives 2 to 9

External additives 2 to 9 were obtained in the same way as in the production example of external additive 1, except that conditions were changed to those shown in Table 2.

TABLE 2

| | | Treatment agent 1 | | Treatment agent 2 | | |
|---|---|---|---|---|---|---|
| External additive No. | Type | Treatment agent | Treatment amount (parts) | Treatment agent | Treatment amount (parts) | Number average particle diameter nm |
| 1 | Strontium titanate | 3,3,3-trifluoropropyl methyldimethoxysilane | 4.5 | Isobutyltrimethoxysilane | 4.5 | 40 |
| 2 | Strontium titanate | 3,3,3-trifluoropropyl trimethoxysilane | 4.5 | — | — | 60 |

TABLE 2-continued

| External additive No. | Type | Treatment agent 1: Treatment agent | Treatment agent 1: Treatment amount (parts) | Treatment agent 2: Treatment agent | Treatment agent 2: Treatment amount (parts) | Number average particle diameter nm |
|---|---|---|---|---|---|---|
| 3 | Silica | 3,3,3-trifluoropropyl trimethoxysilane | 1.5 | — | — | 60 |
| 4 | Strontium titanate | 3,3,3-trifluoropropyl trimethoxysilane | 4.5 | — | — | 30 |
| 5 | Strontium titanate | Fluorine-modified silicone oil | 3.0 | — | — | 60 |
| 6 | Strontium titanate | Fluorine-modified silicone oil | 2.0 | — | — | 70 |
| 7 | Silica | Fluorine-modified silicone oil | 0.5 | — | — | 60 |
| 8 | Strontium titanate | Silicone oil | 4.5 | — | — | 40 |
| 9 | Silica | Isobutyltrimethoxysilane | 4.5 | — | — | 30 |

Production Example of Toner 1

Toner particle 1 was subjected to external addition. Toner 1 was obtained by dry mixing 100.0 parts of toner particle 1, 0.5 parts of external additive 1 and 1.0 parts of external additive 9 for 7 minutes at a peripheral speed of 38 m/sec using a Henschel mixer (produced by Mitsui Mining Co., Ltd.). Physical properties of obtained toner 1 are shown in Table 4.

Production Examples of Toners 2 to 25

Toners 2 to 25 were obtained in the same way as in the production example of toner 1, except that conditions were changed to those shown in Table 3. Physical properties of the obtained toners are shown in Table 4.

TABLE 3

| Toner No. | Toner particle No. | External addition formulation: External additive No. | Parts | External additive No. | Parts | External addition conditions: External addition strength | Time (minutes) |
|---|---|---|---|---|---|---|---|
| 1 | 1 | 1 | 0.20 | 9 | 1.00 | 38 m/sec | 7 |
| 2 | 1 | 1 | 0.50 | 9 | 1.50 | 38 m/sec | 7 |
| 3 | 1 | 1 | 0.20 | 9 | 1.00 | 45 m/sec | 9 |
| 4 | 1 | 1 | 1.00 | 9 | 3.00 | 38 m/sec | 8 |
| 5 | 1 | 1 | 0.05 | 9 | 0.20 | 38 m/sec | 7 |
| 6 | 1 | 1 | 0.05 | 9 | 0.10 | 38 m/sec | 7 |
| 7 | 2 | 1 | 0.20 | 9 | 1.00 | 35 m/sec | 7 |
| 8 | 3 | 1 | 0.20 | 9 | 1.00 | 32 m/sec | 7 |
| 9 | 4 | 1 | 0.20 | 9 | 1.00 | 38 m/sec | 7 |
| 10 | 5 | 1 | 0.20 | 9 | 1.00 | 38 m/sec | 7 |
| 11 | 6 | 1 | 0.20 | 9 | 1.00 | 38 m/sec | 7 |
| 12 | 1 | 2 | 0.20 | 9 | 1.00 | 38 m/sec | 7 |
| 13 | 1 | 3 | 1.20 | — | — | 38 m/sec | 7 |
| 14 | 1 | 4 | 0.20 | 9 | 1.00 | 38 m/sec | 7 |
| 15 | 1 | 5 | 0.20 | 9 | 1.00 | 38 m/sec | 7 |
| 16 | 1 | 6 | 0.20 | 9 | 1.00 | 38 m/sec | 7 |
| 17 | 4 | 7 | 0.05 | 9 | 0.10 | 32 m/sec | 7 |
| 18 | 7 | 1 | 0.60 | 9 | 0.60 | 38 m/sec | 7 |
| 19 | 8 | 1 | 0.60 | 9 | 0.60 | 38 m/sec | 7 |
| 20 | 9 | 1 | 0.60 | 9 | 0.60 | 38 m/sec | 7 |
| 21 | 10 | 1 | 0.60 | 9 | 0.60 | 38 m/sec | 7 |
| 22 | 1 | 8 | 1.00 | — | — | 38 m/sec | 7 |
| 23 | 11 | 1 | 0.60 | 9 | 0.60 | 38 m/sec | 7 |
| 24 | 11 | 1 | 0.60 | 9 | 0.60 | 45 m/sec | 9 |
| 25 | 11 | 4 | 0.20 | 9 | 1.00 | 38 m/sec | 7 |

TABLE 4

| Toner No. | Amount of external additive A | Charge amount of external additive A | Amount of external additive B | Ratio of external additive B relative to external additive A |
|---|---|---|---|---|
| 1 | 1.20 | −12.3 | 0.60 | 50% |
| 2 | 2.00 | −25.0 | 1.00 | 50% |
| 3 | 0.96 | −12.3 | 0.15 | 16% |
| 4 | 3.60 | −12.3 | 1.80 | 50% |
| 5 | 0.25 | −12.3 | 0.13 | 50% |
| 6 | 0.15 | −20.0 | 0.08 | 50% |
| 7 | 1.20 | −12.3 | 0.84 | 70% |
| 8 | 1.20 | −12.3 | 1.02 | 85% |

TABLE 4-continued

| Toner No. | Amount of external additive A | Charge amount of external additive A | Amount of external additive B | Ratio of external additive B relative to external additive A |
|---|---|---|---|---|
| 9 | 1.20 | −12.3 | 0.60 | 50% |
| 10 | 1.20 | −12.3 | 0.60 | 50% |
| 11 | 1.20 | −12.3 | 0.60 | 50% |
| 12 | 1.20 | −5.0 | 0.60 | 50% |
| 13 | 1.20 | −5.0 | 0.60 | 50% |
| 14 | 1.20 | −30.0 | 0.60 | 50% |
| 15 | 1.20 | −3.0 | 0.60 | 50% |
| 16 | 1.20 | −1.8 | 0.60 | 50% |
| 17 | 0.15 | −0.8 | 0.13 | 85% |
| 18 | 1.20 | −12.3 | 0.60 | 50% |
| 19 | 1.20 | −12.3 | 0.60 | 50% |
| 20 | 1.20 | −12.3 | 0.60 | 50% |
| 21 | 1.20 | −12.3 | 0.60 | 50% |
| 22 | 1.00 | 3.0 | 0.50 | 50% |
| 23 | 0.84 | −12.3 | 0.63 | 75% |
| 24 | 0.60 | −12.3 | 0.09 | 16% |
| 25 | 0.84 | −30.0 | 0.63 | 75% |

The amount of the external additive A and the amount of the external additive B are parts by mass relative to 100 parts by mass of the toner particle. The unit of the charge amount is μC/g. The proportion of the external additive B is mass % relative to the external additive A.

Example 1

Toner Evaluations

The following real equipment evaluations were carried out using toner 1. The evaluation results are shown in Table 5.

Toner evaluations were carried out using a modified version of a commercially available "LBP7600C" laser beam printer produced by Canon Inc. The printer was modified by altering the gears and software of the evaluation apparatus main body so that speed of rotation of a developing roller was set so as to rotate at twice the peripheral speed of the drum. In addition, a pre-exposure device was removed from the laser beam printer. By carrying out the modifications mentioned above, transfer of the external additives from the toner was facilitated and a harsher mode was used when evaluating changes in image density, scratches on an electrostatic latent image bearing member and level of contamination of a charging member.

Next, an electrophotographic device and a process cartridge were left to stand for 48 hours in an environment at a temperature of 23° C. and a relative humidity of 50% in order for these components to acclimatize to a measurement environment. After being left to stand, 20000 images having a print percentage of 4.0% were printed out in the transverse direction in the center of "letter" sized Business 4200 paper (produced by XEROX, 75 g/m$^2$), with 50 mm margins on the left and right of the paper, in the same normal temperature normal humidity environment (23° C./50% RH), and after outputting the 10th image, after outputting the 1000th image and after outputting the 20,000th image, evaluations were carried out.

Evaluation of Image Streaks After Long Term Use

Image streaks were evaluated in the following way. First, a drum unit for image checking and a drum unit for durability were prepared. The drum unit for durability was attached, and the 20000 images mentioned above were printed out. Next, a toner evaluation charging roller was attached to the drum unit for image checking, and an image was outputted. A half tone image having a toner laid-on level of 0.25 mg/cm$^2$ was outputted and evaluated using the following criteria. An evaluation of C or better was assessed as being good.

Evaluation Criteria

A: No vertical streak-like blank patches were seen on the image.

B: 1 to 2 vertical streak-like blank patches were seen on the image.

C: 3 to 4 vertical streak-like blank patches were seen on the image.

D: 5 or more vertical streak-like blank patches were seen on the image.

Moreover, it is known that streak-like image density non-uniformity occurs in cases where charging distribution is broad.

Evaluation of Black Spots Following Long Term Use

After outputting 20000 images, 10 consecutive solid white images were outputted and evaluated using the following criteria. An evaluation of C or better was assessed as being good.

Evaluation Criteria

A: No black spots were seen on the 10 images.

B: 1 to 2 black spots were seen on the 10 images.

C: 3 to 5 black spots were seen on the 10 images.

D: 6 or more black spots were seen on the 10 images.

Moreover, it is known that localized printing occurs on a white background part, which results in black spots, if the toner is charged up.

Evaluation of Contamination of Members (Fogging Following Long Term Use)

After outputting 10 images and after outputting 1000 images, 9 longitudinal band-like solid images measuring 3 cm in the center were outputted and 1 white image was outputted using a paper to which a tag was attached in order to mask to the center of the printed surface of the image, and fogging density in the white image was evaluated. Evaluation criteria are as follows, and an evaluation of C or better was assessed as being good.

Moreover, fogging density was measured in terms of reflectance (%) using a digital white light meter (a TC-6D produced by Tokyo Denshoku Co., Ltd., which uses a green filter). For the white image, the tag was removed, the reflectance (%) was measured at five points on the portion where the tag had been attached and five points on the portion where the tag had not been attached, the average of these values was determined, and the difference between these average values was determined and taken to be the fogging density.

A: The difference in fogging density between after outputting 10th image and after outputting 1000th image is 0.20 or less.

B: The difference in fogging density between after outputting 10th image and after outputting 1000th image is from 0.21 to 0.50.

C: The difference in fogging density between after outputting 10th image and after outputting 1000th image is from 0.51 to 0.80.

D: The difference in fogging density between after outputting 10th image and after outputting 1000th image is 0.81 or more.

Moreover, it is known that in a case where a charging roller is contaminated by continuously outputting longitudinal band-like images, toner remaining on the drum leads to white parts, and fogging occurs.

Evaluation of Initial Image Density

After outputting 10 images and after outputting 1000 images, a solid image was outputted, and the difference between initial image density and image density following long term use were evaluated using the following criteria, with an evaluation of C or better being assessed as good.

A Macbeth RD918 reflection densitometer (produced by Macbeth Corp.) was used for measuring image density, the relative density relative to a white printout having a document density of 0.00 was measured, and initial image density was evaluated using the arithmetic mean value of image density at five arbitrary positions on a solid image.

A: The difference in solid density between after outputting 10th image and after outputting 1000th image is 0.03 or less.

B: The difference in solid density between after outputting 10th image and after outputting 1000th image is from 0.04 to 0.06.

C: The difference in solid density between after outputting 10th image and after outputting 1000th image is from 0.07 to 0.09.

D: The difference in solid density between after outputting 10th image and after outputting 1000th image is 0.10 or more.

Moreover, it is known that if a toner has good charge rising performance, initial image density is similar to that during long term use.

Examples 2 to 21 and Comparative Examples 1 to 4

Toners 2 to 25 were subjected to the same evaluations as Example 1. Evaluation results for Examples 2 to 21 and Comparative Examples 1 to 4 are shown in Table 5.

TABLE 5

| | | Toner No. | Streaks after long term use | | Black spots after long term use | | Fogging after long term use | | Initial image density | |
|---|---|---|---|---|---|---|---|---|---|---|
| Example | 1 | 1 | 0 | A | 0 | A | 0.00 | A | 0.02 | A |
| | 2 | 2 | 0 | A | 0 | A | 0.10 | A | 0.01 | A |
| | 3 | 3 | 0 | A | 2 | B | 0.00 | A | 0.01 | A |
| | 4 | 4 | 0 | A | 0 | A | 0.70 | C | 0.01 | A |
| | 5 | 5 | 2 | B | 0 | A | 0.10 | A | 0.03 | A |
| | 6 | 6 | 3 | C | 0 | A | 0.10 | A | 0.04 | B |
| | 7 | 7 | 1 | B | 0 | A | 0.18 | A | 0.04 | B |
| | 8 | 8 | 3 | C | 2 | B | 0.50 | A | 0.01 | A |
| | 9 | 9 | 4 | C | 3 | C | 0.10 | A | 0.01 | A |
| | 10 | 10 | 0 | A | 0 | A | 0.25 | B | 0.01 | A |
| | 11 | 11 | 2 | B | 0 | A | 0.48 | B | 0.01 | A |
| | 12 | 12 | 0 | A | 0 | A | 0.40 | B | 0.01 | A |
| | 13 | 13 | 0 | A | 0 | A | 0.53 | C | 0.01 | A |
| | 14 | 14 | 1 | B | 2 | B | 0.10 | A | 0.00 | A |
| | 15 | 15 | 1 | B | 0 | A | 0.10 | A | 0.05 | B |
| | 16 | 16 | 3 | C | 0 | A | 0.45 | B | 0.07 | C |
| | 17 | 17 | 4 | C | 4 | C | 0.60 | C | 0.09 | C |
| | 18 | 18 | 0 | A | 0 | A | 0.00 | A | 0.01 | A |
| | 19 | 19 | 1 | B | 2 | B | 0.00 | A | 0.01 | A |
| | 20 | 20 | 0 | A | 1 | B | 0.00 | A | 0.01 | A |
| | 21 | 21 | 2 | B | 2 | B | 0.00 | A | 0.02 | A |
| Comparative example | 1 | 22 | 6 | D | 3 | C | 0.10 | A | 0.15 | D |
| | 2 | 23 | 8 | D | 1 | B | 0.72 | C | 0.02 | A |
| | 3 | 24 | 2 | B | 9 | D | 0.04 | B | 0.02 | A |
| | 4 | 25 | 8 | D | 9 | D | 0.75 | C | 0.01 | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123742, filed Jul. 28, 2021, which is hereby incorporated by reference herein in its entirety.

What is claimed is:

1. A method for producing a toner comprising a toner particle and an external additive on a surface of the toner particle, the toner particle comprising a core particle and a shell on a surface of the core particle, the core particle comprising a binder resin, the binder resin comprising a resin having an ester bond, the external additive consisting of an inorganic fine particle surface-treated with a fluorine-containing silane coupling agent, and an inorganic fine particle surface-treated with a silane coupling agent not containing fluorine, the method comprising the steps of:

preparing a dispersed solution of binder resin fine particles containing the binder resin;

aggregating binder resin fine particles contained in the dispersed solution of binder resin fine particles so as to form a dispersed solution containing aggregates;

adding a source of boric acid and shell-forming resin fine particles to the dispersed solution containing aggregates, the shell-forming resin fine particles containing a shell-forming resin, and causing the resin fine particles to adhere to the aggregates, and forming aggregates having a shell;

heating and fusing the aggregates having a shell to prepare the toner particle; and adding the external additive on the surface of the toner particle, wherein when a dispersed solution obtained by dispersing the toner in an aqueous solution containing a surfactant is subjected to a detachment treatment A including shaking for 300 seconds using a shaker, and when an external additive detached from the toner by the detachment treatment A is denoted as external additive A, a charge amount of the external additive A using a standard carrier (F81) is −0.5 μC/g or less, a amount of the external additive A relative to the amount of the external additive is 80 to 100 mass %, a peak corresponding to boric acid is detected in ATR-IR analysis of the toner particle in an ATR method using germanium as an ATR crystal, and an intensity of boron derived from the boric acid in the toner particle in fluorescence X-Ray measurements of the toner particle is 0.10 to 0.60 kcps.

2. The method according to claim 1, wherein the inorganic fine particle surface-treated with a fluorine-containing silane coupling agent is a strontium titanate fine particle surface-treated with a fluorine-containing silane coupling agent.

3. The method according to claim 1, wherein the resin having the ester bond is at least one member selected from the group consisting of styrene acrylic resins, polyester resins, and mixed resins thereof and composite resins thereof.

4. The method according to claim 1, wherein the resin having the ester bond is a polyester resin.

5. The method according to claim 1, wherein a content of the external additive A is 0.10 to 10.00 parts by mass relative to 100 parts by mass of the toner particle.

6. The method according to claim 1, wherein when a dispersed solution obtained by dispersing the toner in an aqueous solution containing a surfactant is subjected to a detachment treatment B including shaking for 30 seconds using a shaker, and when an external additive detached from the toner by the detachment treatment B is denoted as an external additive B, an amount of the external additive B relative to an amount of the external additive A is 20 to 80 mass %.

* * * * *